(12) United States Patent
Bickersteth et al.

(10) Patent No.: US 7,715,947 B2
(45) Date of Patent: *May 11, 2010

(54) SYSTEM FOR LAPPING RING AND PINION GEARS

(75) Inventors: Daniel Thomas Bickersteth, West Bloomfield, MI (US); Robert G. Greene, Canton, MI (US); Kenneth John Gembel, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/868,682

(22) Filed: Oct. 8, 2007

(65) Prior Publication Data

US 2008/0046124 A1 Feb. 21, 2008

Related U.S. Application Data

(63) Continuation of application No. 11/440,376, filed on May 24, 2006, now Pat. No. 7,299,533.

(51) Int. Cl.
*G06F 19/00* (2006.01)
(52) U.S. Cl. .................. 700/245; 700/255; 318/568.1; 29/428; 29/430; 29/563; 901/1; 901/2; 901/6; 901/7; 901/8; 198/346.2; 198/468.2; 483/14; 483/16; 483/22; 483/901; 483/902
(58) Field of Classification Search ............... 700/245, 700/255; 29/428, 430, 563; 414/791.7, 749.4; 198/36.46; 428/36.46; 901/1, 2, 6, 7, 8, 901/30, 31, 41; 483/14, 16, 22, 901, 902; 74/490.01
See application file for complete search history.

(56) References Cited

U.S. PATENT DOCUMENTS

| | | | |
|---|---|---|---|
| 3,541,921 A | | 11/1970 | Helfer et al. |
| 3,968,885 A | | 7/1976 | Hassan et al. |
| 4,072,236 A | | 2/1978 | Nomura et al. |
| 4,400,859 A | * | 8/1983 | Woythal et al. ............. 29/27 C |
| 4,654,957 A | | 4/1987 | Powell et al. |
| 4,655,676 A | | 4/1987 | Jannborg et al. |
| 4,678,393 A | | 7/1987 | Mink |
| 5,097,575 A | * | 3/1992 | Mitsukuchi et al. ......... 29/27 C |
| 5,117,544 A | * | 6/1992 | Kousaku et al. ............. 29/27 C |

(Continued)

*Primary Examiner*—Khoi Tran
*Assistant Examiner*—McDieunel Marc
(74) *Attorney, Agent, or Firm*—Harness, Dickey & Pierce, P.L.C.

(57) ABSTRACT

A system for lapping gear sets with a ring gear and a pinion gear. The system includes a lapping machine tool and a robot. The lapping machine tool has a first spindle and a second spindle. The second spindle is rotatable about an axis that is generally perpendicular to a rotational axis of the first spindle. The lapping machine tool has a loading zone for loading the first and second spindles. The robot has an end effector with a first end that is configured to hold one of the gear sets. The robot is configured to position the first end of the end effector into the loading zone and to load the first gear set to the lapping machine tool without removing the end effector from the loading zone such that the ring gear is loaded onto the first spindle and the pinion gear is loaded onto the second spindle.

21 Claims, 10 Drawing Sheets

U.S. PATENT DOCUMENTS

| | | |
|---|---|---|
| 5,811,951 A | 9/1998 | Young |
| 5,967,882 A | 10/1999 | Duescher |
| 5,993,298 A | 11/1999 | Duescher |
| 6,048,254 A * | 4/2000 | Duescher ............... 451/28 |
| 6,102,777 A | 8/2000 | Duescher et al. |
| 6,120,352 A * | 9/2000 | Duescher ............... 451/41 |
| 6,149,506 A * | 11/2000 | Duescher ............... 451/59 |
| 6,357,994 B1 | 3/2002 | St. Onge |
| 6,702,646 B1 | 3/2004 | Gitis et al. |
| 6,860,380 B2 | 3/2005 | Watanabe et al. |
| 6,889,119 B2 | 5/2005 | Riff et al. |
| 6,898,484 B2 | 5/2005 | Lemelson et al. |
| 7,299,533 B1 * | 11/2007 | Bickersteth et al. ........ 29/563 |
| 7,553,115 B2 * | 6/2009 | McGlasson et al. ........ 409/27 |

* cited by examiner

SYSTEM FOR LAPPING RING AND PINION GEARS

This application is a continuation of co-pending U.S. patent application Ser. No. 11/440,376 filed May 24, 2006 and entitled "Process For Lapping Ring And Pinion Gears", now U.S. Pat. No. 7,299,533, the disclosure of which is hereby incorporated by reference as if fully set forth in detail herein.

INTRODUCTION

The present invention generally relates to manufacturing methods and tooling for the high-volume finishing of gearsets for automotive differentials and more particularly to manufacturing methods and tooling for processing a ring gear and pinion gear through a lapping operation.

Modern automotive vehicles typically include a differential for controlling the transmission of drive torque to the driven wheels of the vehicle. The differential can include an input pinion and a ring gear. The input pinion can receive torque from the vehicle transmission or transfer case and can transmit the torque to the ring gear via the meshing teeth of the input pinion and ring gear. The ring gear can be coupled to a differential case, which can house a plurality of pinion gears and a pair of side gears that cooperate to differentiate drive torque between the two side gears.

As the input pinion can be driven at relatively high rotational speeds, relatively small variances in the shape of the teeth of the input pinion and/or the ring gear can generate noise and vibration that can be transmitted into the interior of the vehicle. Typically, the input pinion and ring gear are processed through a lapping operation wherein the teeth are micro-finished such that the teeth of one component more exactingly match the teeth of the other component. This matched set of gears is thereafter assembled to a differential.

The machine tool for lapping the input pinion and the ring gear includes first and second spindles that are arranged about perpendicular axes. As automotive differentials are commonly produced in high volume, a feed system is typically employed to automate the loading and unloading of the spindles Heretofore, all of the known feed systems for loading input pinions and ring gears into a lapping machine tool employed two gantry-type loaders, wherein a first one of the gantry-type loaders loaded and unloaded ring gears and the other gantry-type loader loaded and unloaded input pinions. As the cycle time for the lapping operation can be relatively long, it is not uncommon for a gantry-type loader to service several lapping machine tools.

Gantry-type loaders have been employed to automate the loading and unloading of lapping machine tools due to the relatively small zone that is provided by those machine tools for the loading and unloading operation. This zone appears to permit access to the spindles from only two orthogonal directions: a vertical direction downwardly to the spindles and a horizontal direction into the front of the machine tool. Given considerations for minimizing floor space by the equipment for performing the lapping operation, and as gantry-type loaders can shuttle the input pinions and ring gears in an vertical direction, the horizontal loading direction has largely been ignored and the industry appears to have focused exclusively on gantry-type loaders for performing this operation.

While gantry-type loaders can work well for this function, we have noted several drawbacks. For example, a gantry-type loader mandates that the lapping machine tools be arranged in rows. Such arrangements, however, may be difficult to obtain where the arrangement is being fitted into an existing production facility that is relatively full of other equipment. In such cases, it may be necessary to relocate/re-arrange other areas (often times at significant cost) simply to obtain an area that is shaped to accommodate an arrangement that employs gantry-type loaders.

Yet another drawback concerns the cost of gantry-type loaders. As will be appreciated, gantry-type loaders are relatively complex and sophisticated pieces of equipment. Consequently, they can be relatively expensive to procure, operate and maintain. Furthermore, as the bulk of the cost of a gantry-type loader is associated with its loading portion rather than its gantry portion, it is typically not cost-effective to employ gantry-type loaders in situations where production volumes are relatively low initially but expected to ramp up over the course of several years (to volumes that readily justify gantry-type loaders). Consequently, while a gantry-type loader can be scaled to a variety of production volumes, it is frequently not possible to justify such automation at relatively low manufacturing volumes.

SUMMARY

In one form, the present teachings provide a system for lapping gear sets that include a ring gear and a pinion gear. The system includes a lapping machine tool and a robot. The lapping machine tool has a first spindle and a second spindle. The second spindle is rotatable about an axis that is generally perpendicular to a rotational axis of the first spindle. The lapping machine tool has a loading zone for loading the first and second spindles. The robot has an end effector with a first end that is configured to hold one of the gear sets. The robot is configured to position the first end of the end effector into the loading zone and to load the first gear set to the lapping machine tool without removing the end effector from the loading zone such that the ring gear is loaded onto the first spindle and the pinion gear is loaded onto the second spindle.

In another form, the present teachings provide a system for lapping gear sets that include a ring gear and a pinion gear. The system includes a robot and an end effector. The robot has an articulating arm with a first arm member and a second arm member that is pivotally coupled to the first arm member. The end effector has a beam portion, a first tooling set and a second tooling set. The beam portion includes a first end and a second end opposite the first end. The beam portion includes a rotational axis that is disposed between the first and second ends. The first tooling set being coupled to the first end of the beam portion and includes a first tooling subset and a second tooling subset. The first tooling subset has a first set of jaws that are arranged about a first gear axis and which are configured to releasably engaging the ring gear of a first one of the gear sets. The second tooling subset has a second set of jaws that are arranged about a second gear axis, which is perpendicular to the first gear axis. The second set of jaws are configured to releasably engage a second gear. The second tooling set is coupled to the second end of the beam portion and is identical to the first tooling set.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
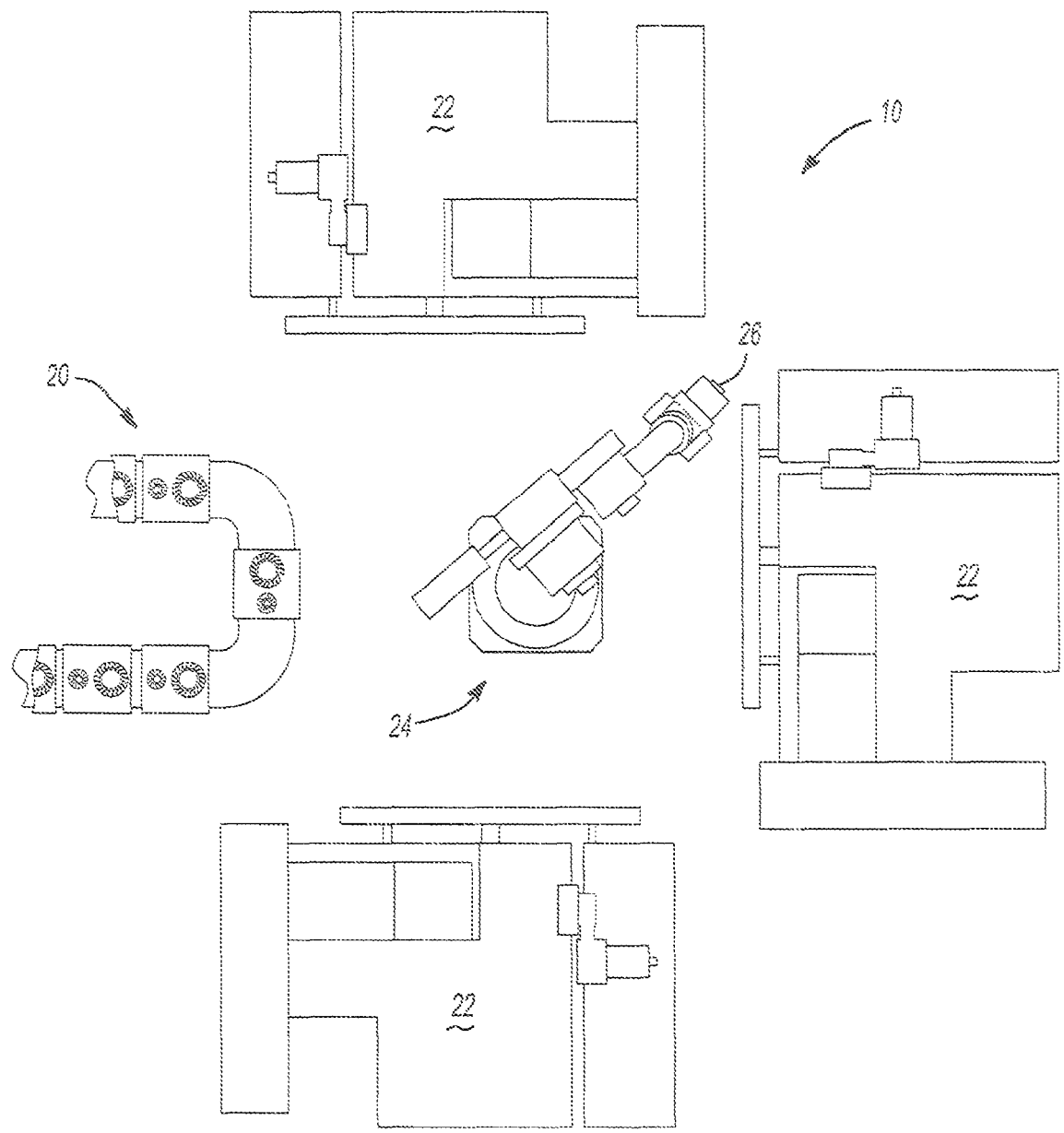
FIG. 1 is a schematic illustration of an exemplary facility that is configured for performing a lapping operation in accordance with the teachings of the present disclosure.
Figure 2:
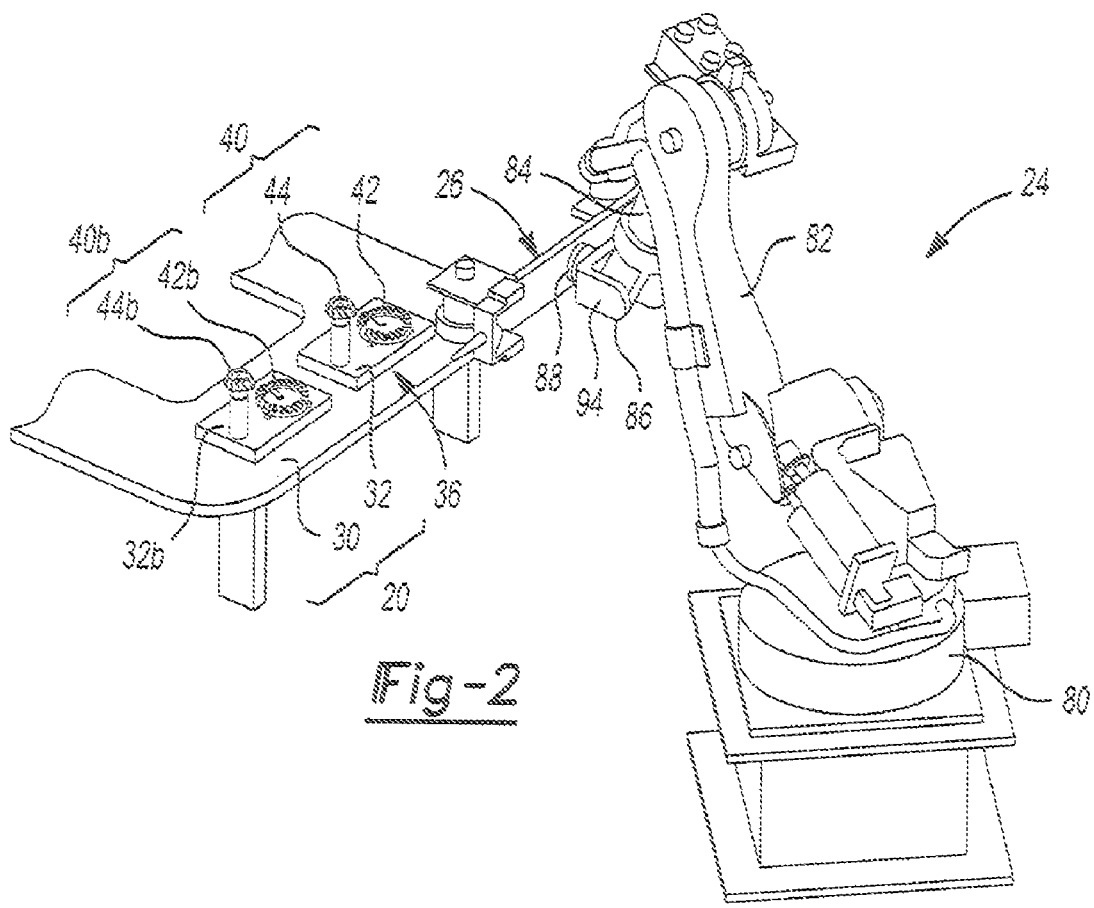
FIG. 2 is a perspective view of a portion of the facility of FIG. 1 illustrating a conveyance system and a robot with an end effector in more detail.

With reference to FIGS. 1 and 2 of the drawings, an exemplary facility for performing a lapping operation in accordance with the teachings of the present disclosure is generally indicated by reference numeral 10. The facility 10 can include a conveyance system 20, a plurality of lapping machine tools 22, a robot 24 and an end effector 26. The conveyance system 20 can include a conventionally constructed power-and-free type conveyor system 30 and a plurality of pallets 32. In so far as the present disclosure is concerned, the conveyance system 20 can be constructed in a conventional and well known manner and as such, need not be discussed in particular detail herein. Briefly, the conveyor system 30 can include a plurality of stations, including a loading station 36, and can be configured to transport the pallets 32 between the various stations in a desired manner. The power-and-free aspect of the conveyor system 30 can be employed to accumulate pallets 32 at one or more of the station, as well as to hold a pallet 32 in a stationary condition at one or more of the stations (e.g., at the loading station 36).

Figure 3:
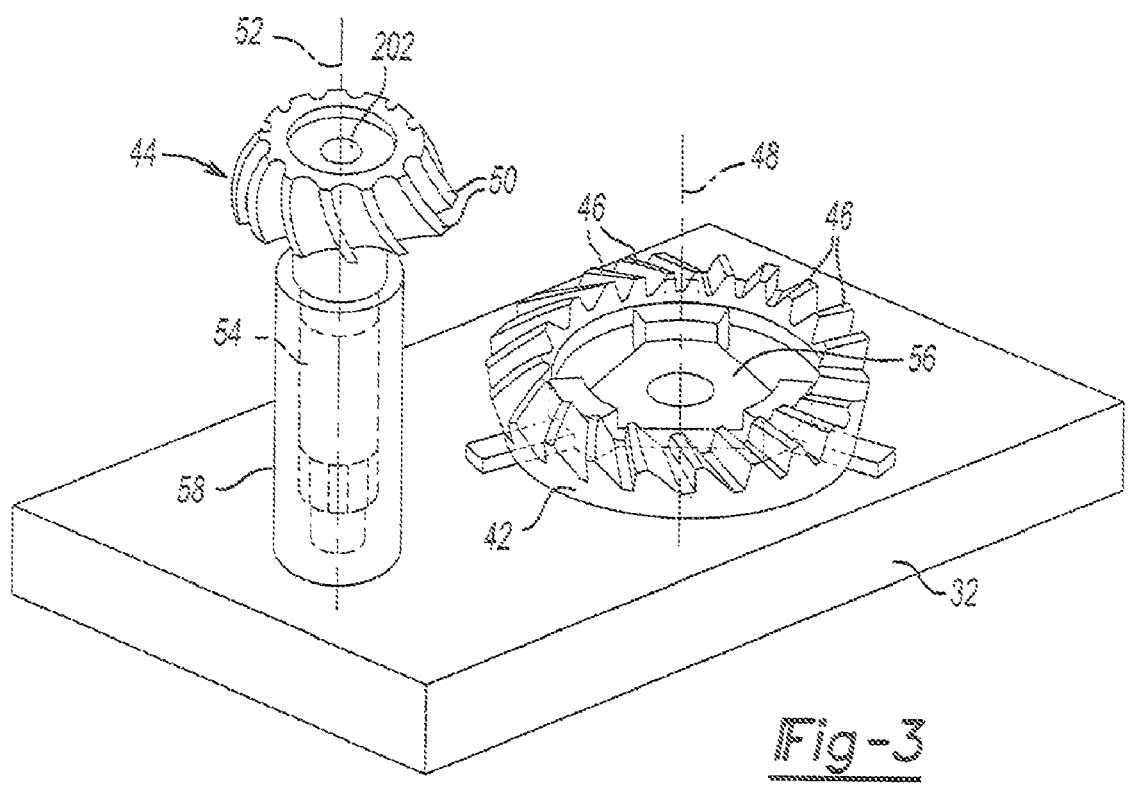
FIG. 3 is a perspective view of a portion of the conveyance system illustrating a pallet with a pinion and a ring gear in more detail.

With reference to FIGS. 2 and 3, the pallet 32 can be configured to transport a gear set 40 that can include a ring gear 42 and a pinion gear 44 of the type that are employed in a differential assembly (not shown) for an automotive vehicle (not shown). The ring gear 42 can have a plurality of gear teeth 46 that are disposed about a rotational axis 48. The pinion gear 44 can have a plurality of gear teeth 50, which are disposed about a rotational axis 52, and a shaft member 54. The pallet 32 can include a first holder 56 and a second holder 58 that can engage the ring gear 42 and the pinion gear 44, respectively, to thereby locate the ring gear 42 and the pinion gear 44 in predetermined locations and orientations. In the particular example provided, the first and second holders 56 and 58 are configured to present the ring gear 42 and the pinion gear 44 such that their rotational axes 48 and 52 are parallel one another.

Figure 4:
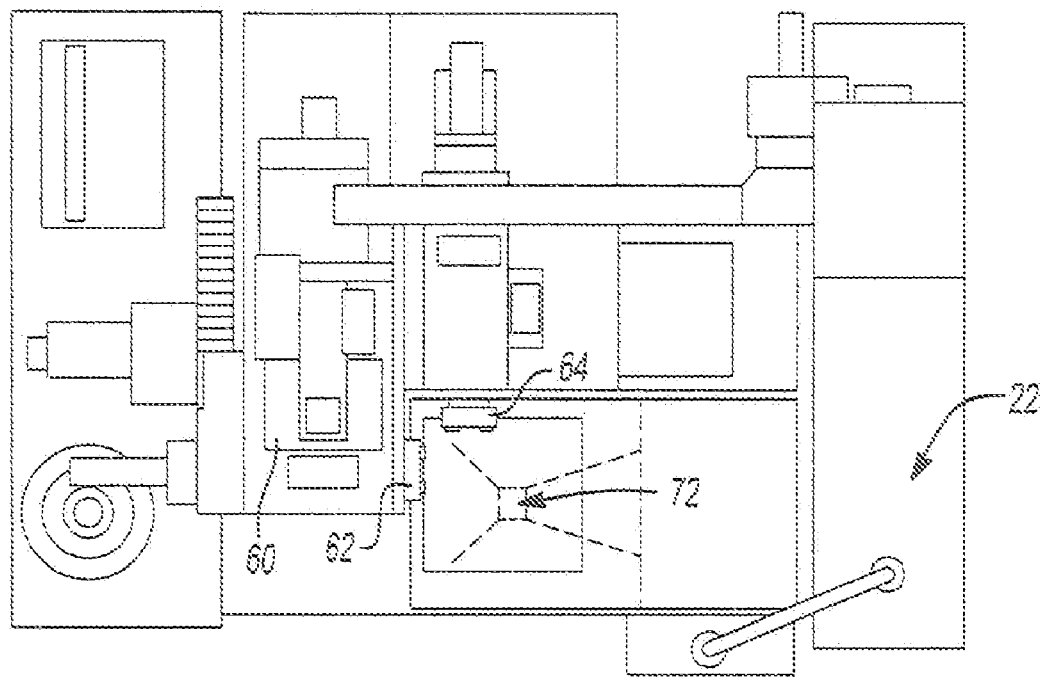
FIG. 4 is a top plan view of a portion of the facility of FIG. 1 illustrating a lapping machine tool in more detail.
Figure 5:
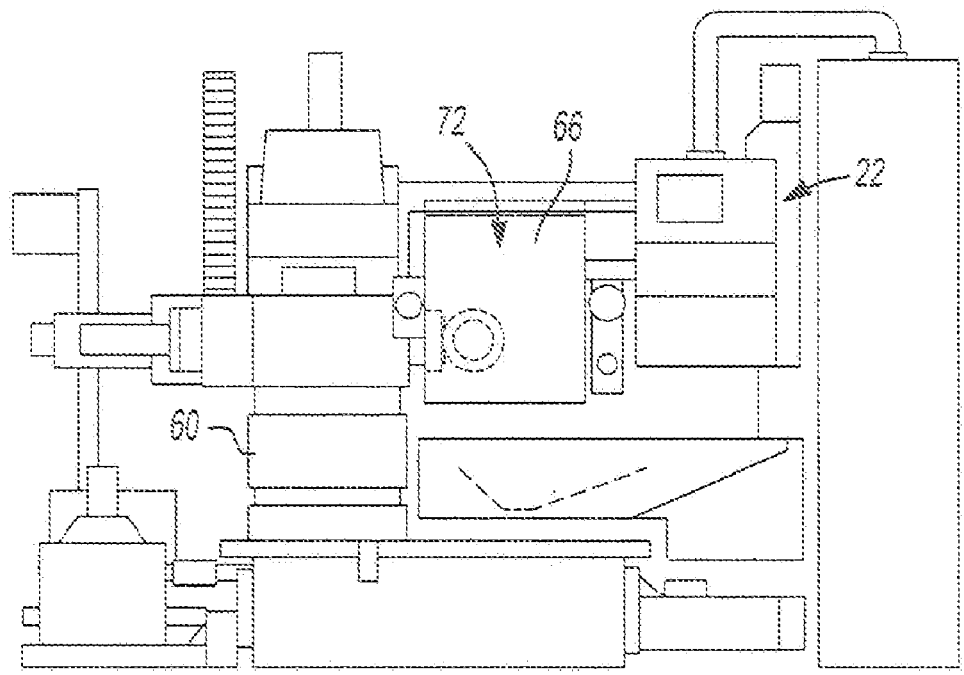
FIG. 5 is a front elevation view of the lapping machine tool.
Figure 6:
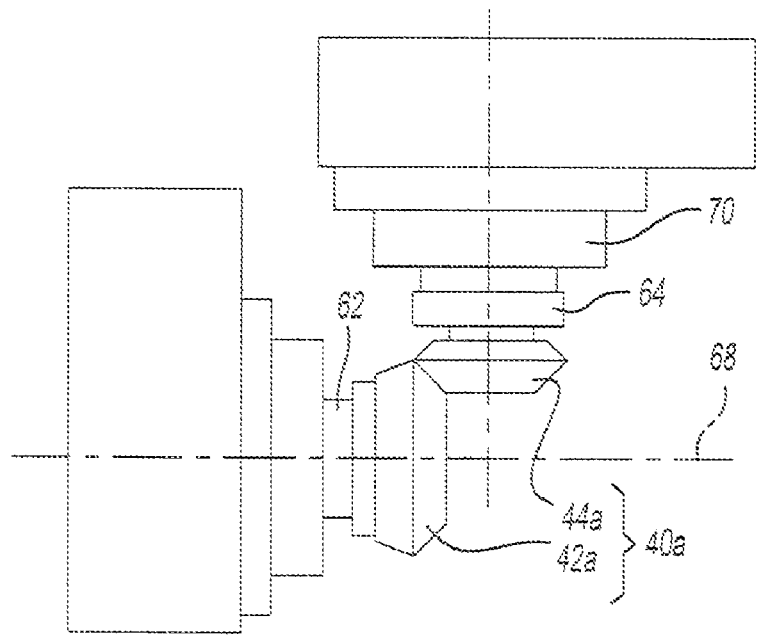
FIG. 6 is an enlarged portion of FIG. 4 illustrating the ring gear and the pinion gear loaded to the spindles of the lapping machine tool.

With reference to FIGS. 4 through 6, the lapping machine tools 22 can be any type of lapping machine, such as a L50 lapping machine tool that is commercially available from Oerlikon Geartec AG. As the lapping machine tools 22 can be conventionally constructed, a detailed discussion of the lapping machine tools 22 need not be provided herein. Briefly, each lapping machine tool 22 can include a frame 60, a first spindle 62, a second spindle 64 and a shroud 66. The frame 60 can be a structure that supports the first and second spindles 62 and 64. The first spindle 62 can have a first rotational axis 68, while the second spindle 64 can have a second rotational axis 70 that can be perpendicular to the first rotational axis 68. The shroud 66 can be movably coupled to the frame 60 and can translate between a first position, which clears the first and second spindles 62 and 64 to permit gears to be loaded to or unloaded from the lapping machine tool 22, and a second position, which shrouds the first and second spindles 62 and 64 when the lapping operation is to be performed.

Each lapping machine tool 22 can have a loading zone 72 which may be employed to load gears into and unload gears from the lapping machine tool 22. In the example provided, the loading zone 72 is defined by the shape and construction of the frame 60 as well as by the amount by which the shroud 66 may translate relative to the first and second spindles 62 and 64. The dimensions of the loading zone 72 can be about 1000 mm wide×about 1000 mm tall×about 1000 mm deep. In the particular example provided, the dimensions of the loading zone are about 600 mm wide×700 mm tall×about 800 mm deep.

Figure 7:
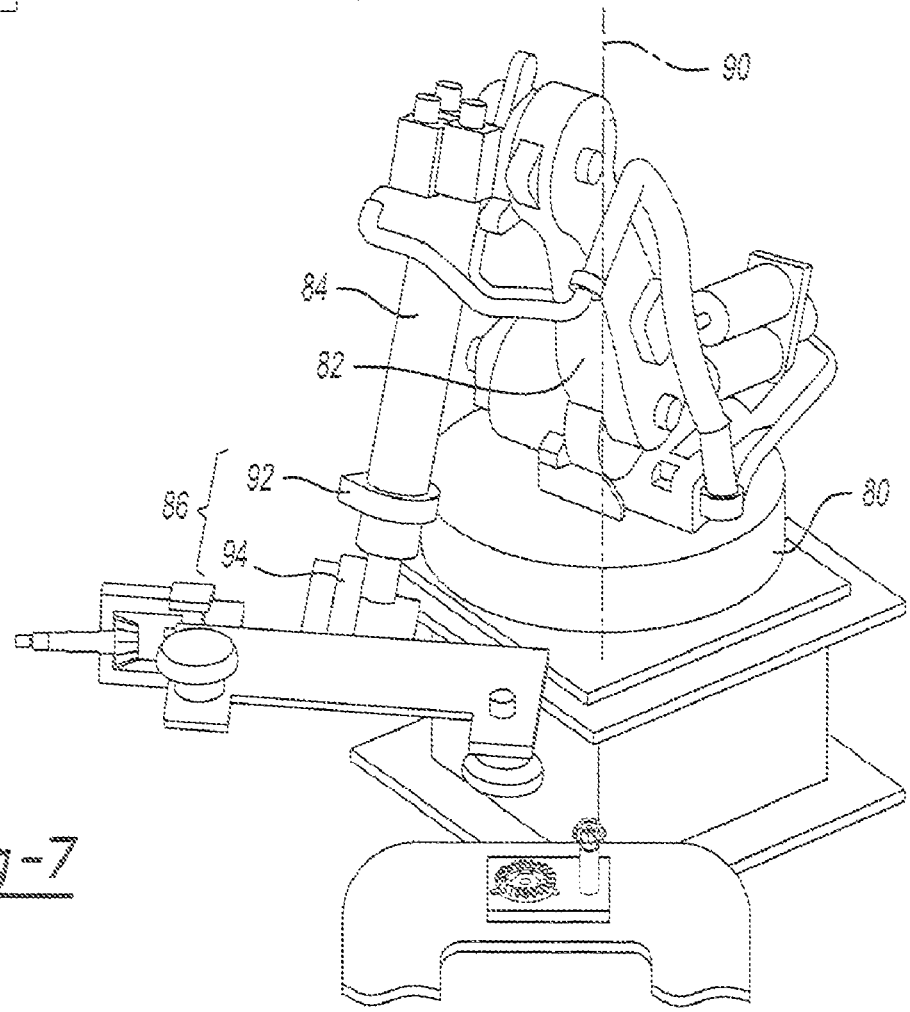
FIG. 7 is another perspective view of the robot, the end effector and a portion of the conveyance system.
Figure 8:
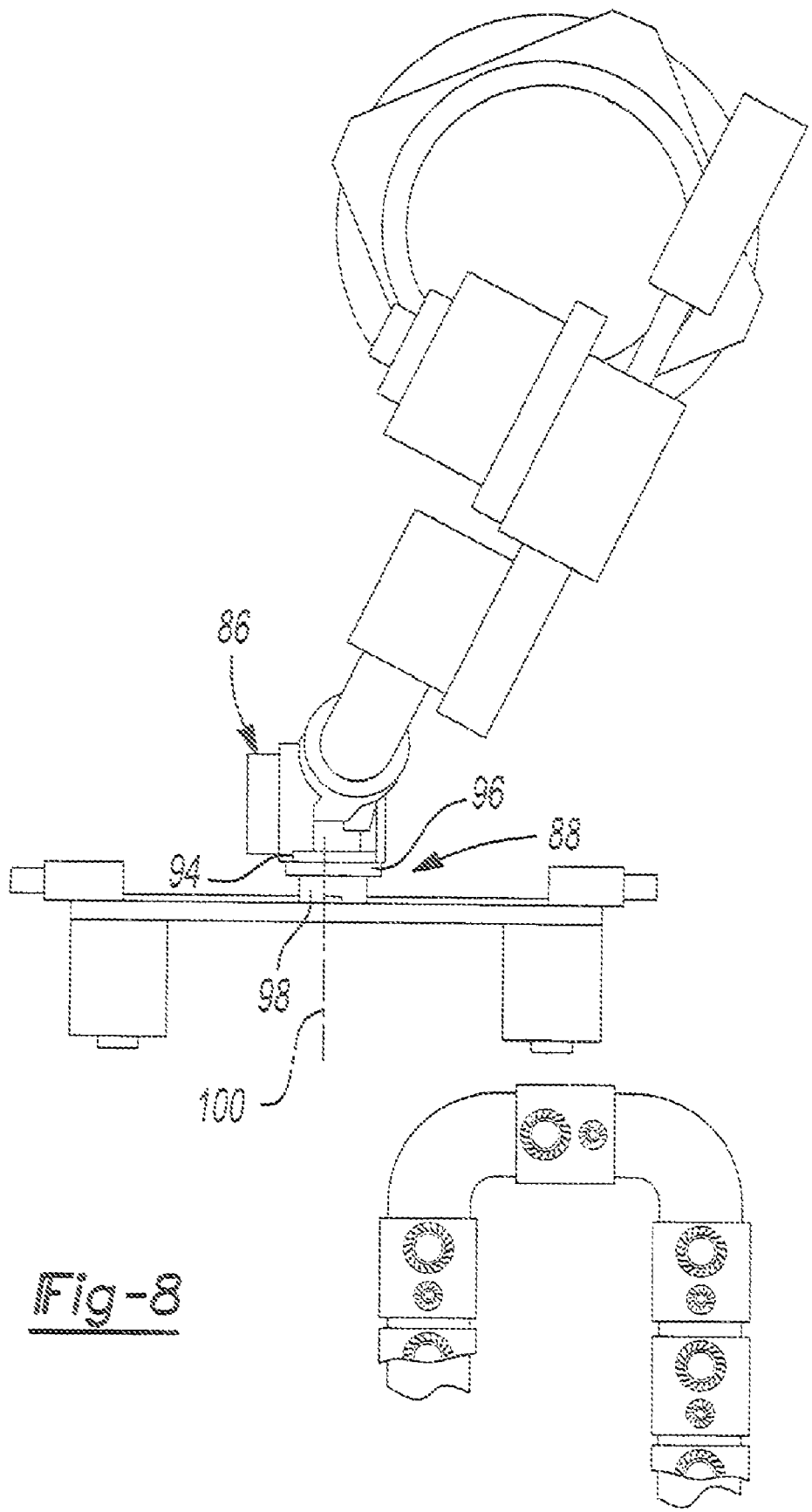
FIG. 8 is a top plan view of the robot, the end effector and a portion of the conveyance system.

Returning to FIG. 2 and with additional reference to FIGS. 7 and 8, the robot 24 can be any type commercially-available industrial robot having an articulating arm configuration, such as a Nachi 166L Robot manufactured by Nachi Robotic Systems, Inc., of Novi, Mich. In the example provided, the robot 24 includes a base 80, a first arm 82, a second arm 84, a knuckle 84 and a rotary coupling 88. The base 80 can be rotatable about a generally vertical axis 90. The first arm 82 can be pivotally coupled to the base 80 and can be movable in a vertical plane that includes the vertical axis 90. The second arm 84 can be pivotally coupled to an end of the first arm 82 opposite the base 80 and can be movable in the aforementioned vertical plane. The knuckle 84 can include a first knuckle portion 92 and a second knuckle portion 94. The first knuckle portion 92 can be coupled to an end of the second arm 84 opposite the first arm 82 and can be rotatable about the longitudinal axis of the second arm 84. The second knuckle portion 94 is pivotally coupled to the first knuckle portion 92 and can be pivoted in a plane that includes the longitudinal axis of the second arm 84. The rotary coupling 88 can have a first coupling portion 96 and a second coupling portion 98. The first coupling portion 96 can be fixedly coupled to an end of the second knuckle portion 94 opposite the first knuckle portion 92, while the second coupling portion 98 can be rotatably coupled to the first coupling portion 96 so as to be rotatable about a longitudinal axis 100 of the rotary coupling 88.

Figure 9:
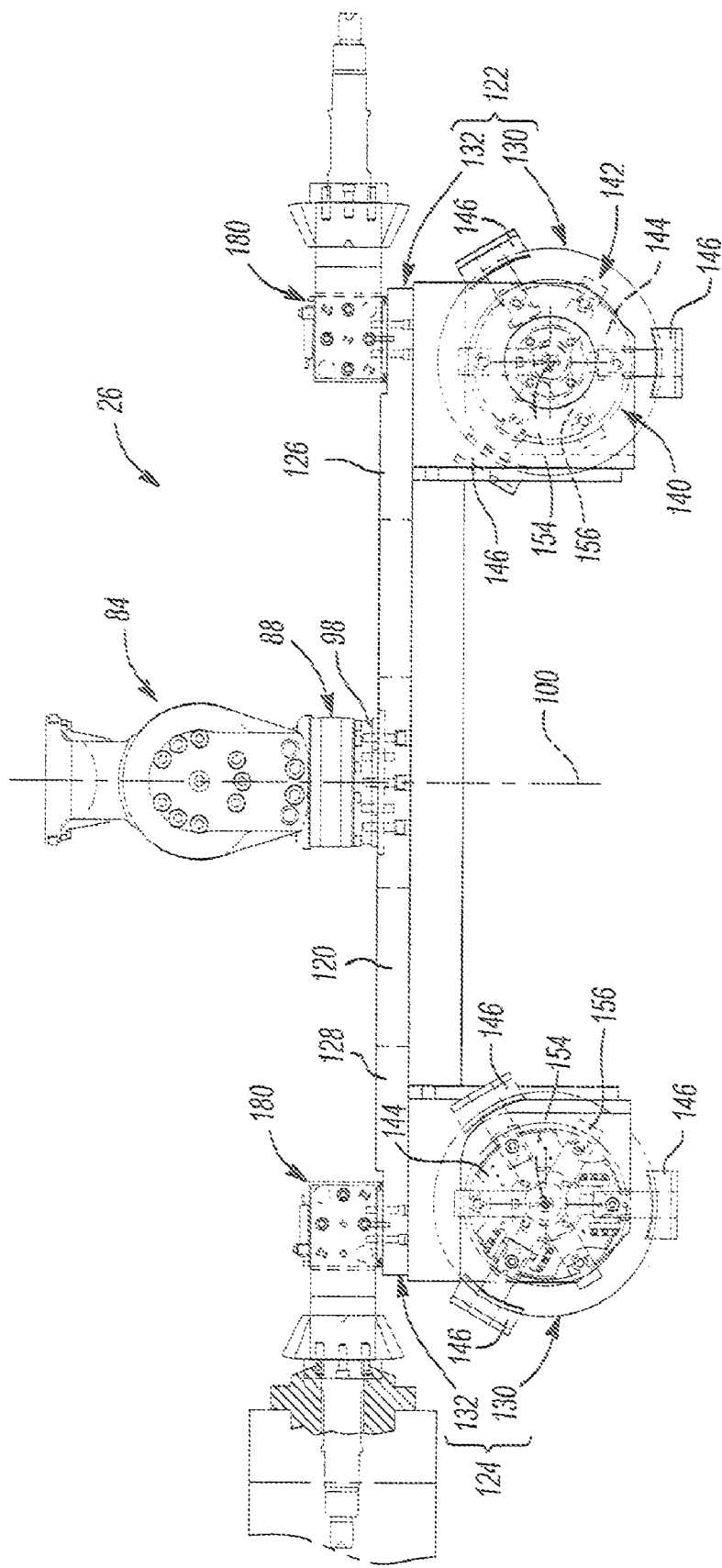
FIG. 9 is a partial side elevation view in partial section of a portion of the facility showing a portion of the robot, the end effector and a portion of the lapping machine tool when a pinion is loaded into/unloaded from an associated spindle of the lapping machine tool.

With reference to FIG. 9, the end effector 26 can include a beam portion 120 and first and second tooling sets 122 and 124 that are coupled to opposite ends 126 and 128 of the beam portion 120. The beam portion 120 can fixedly but removably coupled to the second coupling portion 98. As the first and second tooling sets 122 and 124 can be identically configured, only the first tooling set 122 will be described in detail herein. The first tooling set 122 can include a first tooling subset 130 and a second tooling subset 132.

Figure 10:
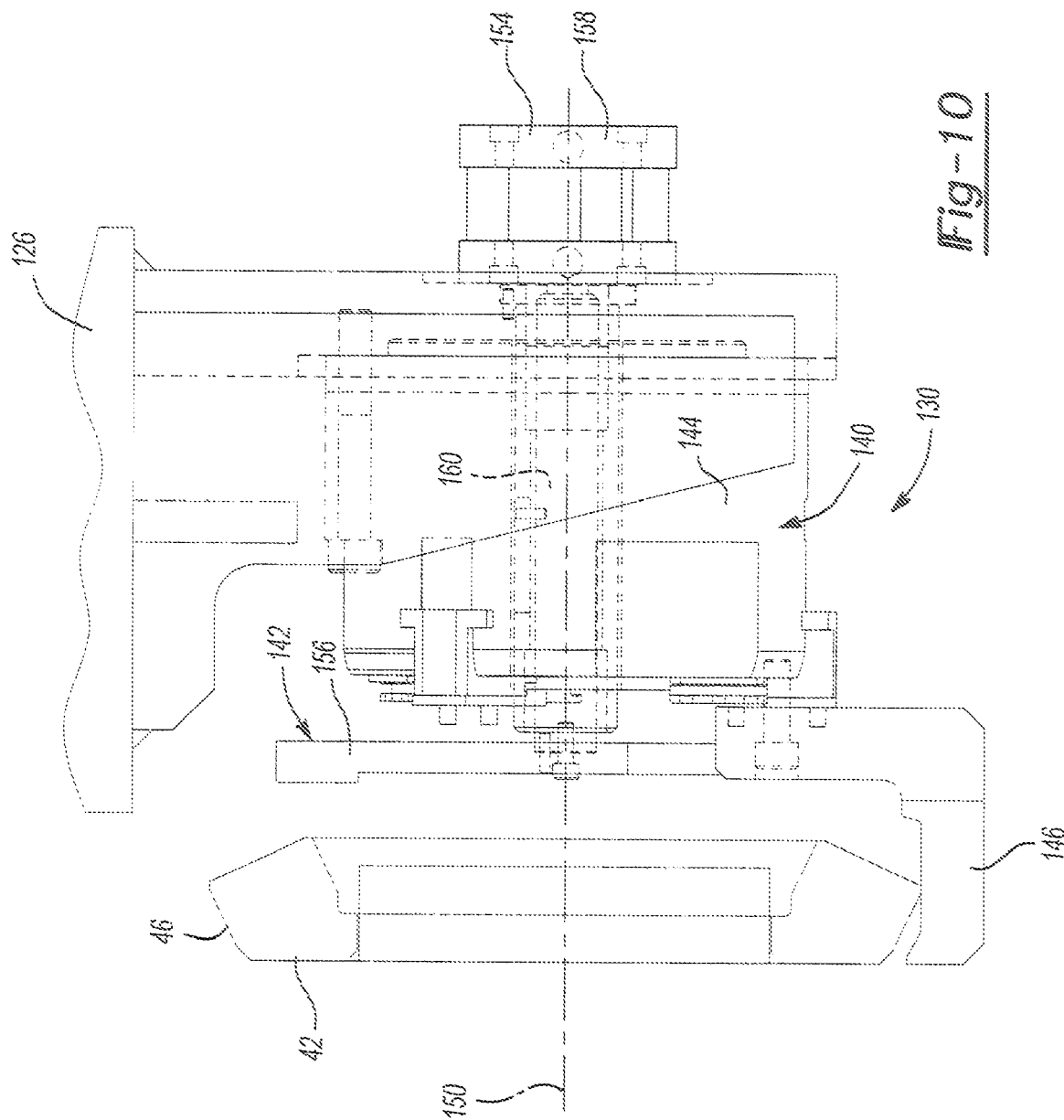
FIG. 10 is a side view of a portion of the end effector, illustrating a portion of the first tooling subset with a ring gear loaded thereto.

With reference to FIGS. 9 and 10, the first tooling subset 130 can include a first concentric gripper 140 and a first thrust assembly 142. The first concentric gripper 140 can include a commercially available first gripper module 144, such as a Robohand 3 jaw gripper manufactured by Robohand Inc., of Monroe, Conn., and a plurality of first jaws 146. The first gripper module 144 can be coupled to the first end 126 of the beam portion 120. The first jaws 146 can be coupled to the first gripper module 144 and arranged about a first tooling axis 150 (those of ordinary skill in the art will appreciate that the first jaws 146 are only partially shown in FIGS. 10 and 13 for purposes of clarity). The first gripper module 144 can be employed to translate the first jaws 146 so that they may grasp and release the ring gear 42. In the particular example provided, the first gripper module 144 translates the first jaws 146 radially inwardly and outwardly relative to the first tooling axis 150 to grasp and release the ring gear 42.

The first thrust assembly 142 can include a cylinder assembly 154 and a thrust plate 156. The cylinder assembly 154 can include a fluid-powered cylinder 158 (e.g., a hydraulic or pneumatic cylinder) with a rod 160 that can be translated along the first tooling axis 150. In the particular example provided, the cylinder assembly 154 is mounted to the first end 126 of the beam portion 120 and the rod 160 is received through the first gripper module 144. The thrust plate 156 can be coupled to the rod 160 and can be located between the beam portion 120 and the portion of the first jaws 146 that contacts the ring gear 42.

Figure 11:
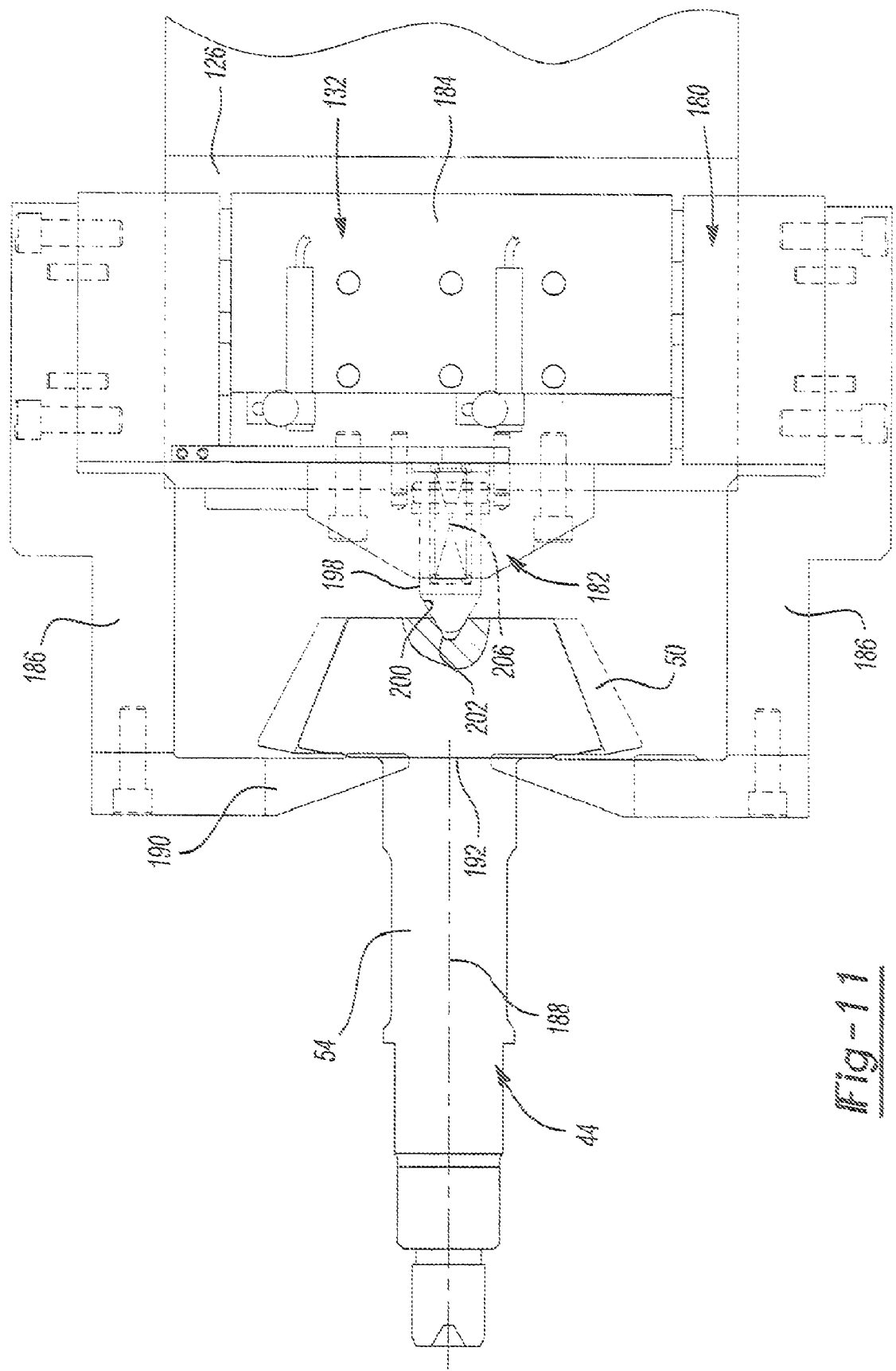
FIG. 11 is a top plan view of a portion of the end effector illustrating a portion of the second tooling subset with a pinion loaded thereto.

With reference to FIGS. 9 and 11, the second tooling subset 132 can include can include a second concentric gripper 180 and a second thrust assembly 182. The second concentric gripper 180 can include a commercially available second gripper module 184, such as a Robohand Parallel Gripper manufactured by Robohand Inc., of Monroe, Conn., and a plurality of second jaws 186. The second gripper module 184 can be coupled to the first end 126 of the beam portion 120 and the second jaws 186 can be coupled to the second gripper module 184 and arranged about a second tooling axis 188 that is generally perpendicular to the first tooling axis 150 (FIG. 10). The second gripper module 184 can be employed to translate the second jaws 186 so that they may grasp and release the pinion gear 44. In the particular example provided, each second jaw 186 has a generally U-shaped end 190 that may translate inwardly around the shaft member 54 of the pinion gear 44 and abut a rear-facing surface 192 of a portion of the pinion gear 44 on which the gear teeth 50 are formed.

The second thrust assembly 182 can be mounted to the second concentric gripper 180 and can include a thrust member 198 that is configured to urge the pinion gear 44 against the U-shaped ends 190 of the second jaws 186 and optionally to aid in positioning the pinion gear 44 relative to the second tooling axis 188. In the particular example provided, the thrust member 198 is a pin having a conical surface 200 that is configured to matingly engage a conical recess 202 that is formed in the pinion gear 44 (e.g., via a center drill). A fluid-powered (e.g., hydraulic or pneumatic) cylinder (not shown) may be employed to move the thrust member 198 along the second tooling axis 188, but in the particular example provided, a compression spring 206 is employed to bias the thrust member 198 toward the second jaws 186.

Figure 12:
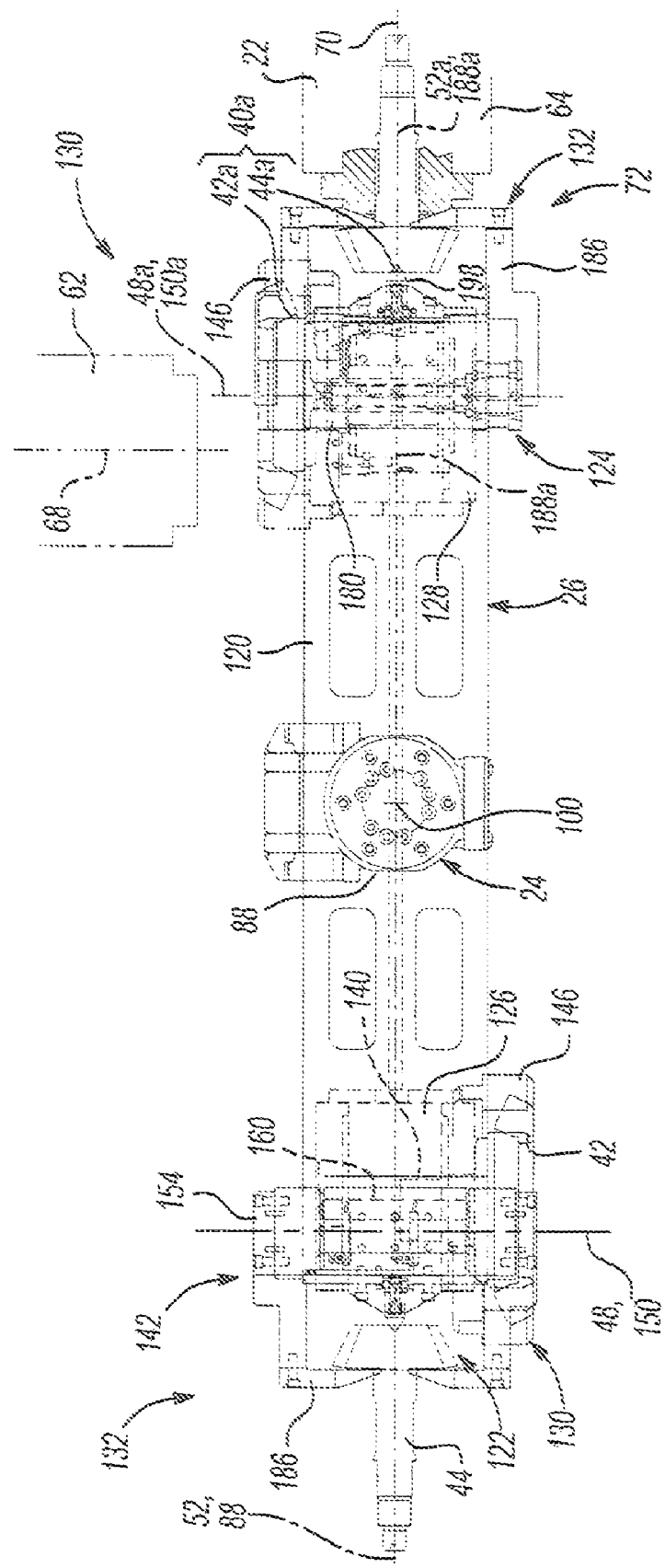
FIG. 12 is a top plan view of a portion of the facility of FIG. 1 illustrating the loading/loading of a pinion to/from an associated spindle.

With reference to FIG. 12, the second tooling set 124 can be identical to the first tooling set 122 as noted above and as such, need not be described in detail herein. Briefly, the first jaws 146 of the first tooling subset 130 of the second tooling set 124 can be disposed about a tooling axis 150a, while the second jaws 186 of the second tooling subset 132 of the second tooling set 124 can be disposed about a tooling axis 188a. It will be appreciated, however, that the second tooling set 124 will be coupled to the second end 128 of the beam portion 120 in a manner that is mirrored the rotational (longitudinal) axis 100 of the rotary coupling 88 about a first mirror plane, which is parallel to the first tooling axis 150 and a second mirror plane, which is parallel to the second tooling axis 188. Stated another way, the first tooling subset 130 of the second tooling set 124 is located on a side of the beam portion 120 opposite the side on which the first tooling subset 130 of the first tooling set 122 is located, and the second tooling subset 132 of the second tooling set 124 is located on a side of the beam portion 120 opposite the side on which the second tooling subset 132 of the first tooling set 122 is located. In this way, the first and second tooling subsets 130 and 132 of the first and second tooling sets 122 and 124 can be presented to the lapping machine tool 22 in a consistent manner when the end effector 26 is rotated about the rotational (longitudinal) axis 100 of the rotary coupling 88.

Figure 13:
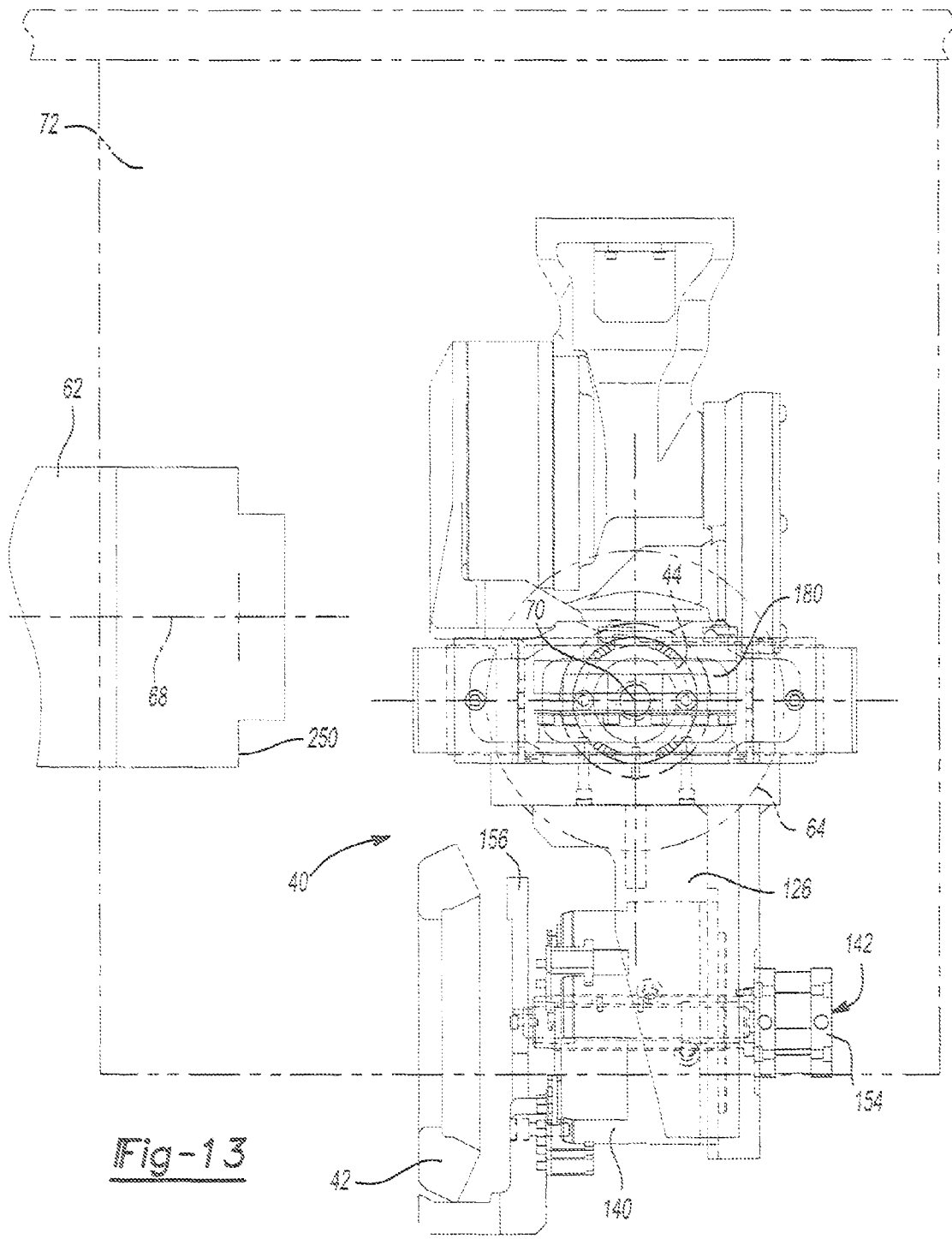
FIG. 13 is a front view of a portion of the facility of FIG. 1 illustrating the loading/unloading of a pinion to/from an associated spindle.

With reference to FIGS. 2, 12 and 13, the facility 10 can be operated such that a first gear set 40 can be transported on a pallet 32 to the loading station 36 and the robot 24 can be employed to load the first gear set 40 into the first tooling set 122 on the first end 126 of the end effector 26. In the particular example provided, the ring gear 42 is unloaded from the pallet 32 prior to the pinion gear 44, but it will be appreciated that this order may be reversed.

Loading of the ring gear 42 to the first end 126 of the end effector 26 can include aligning the robot 24 and the end effector 26 to the ring gear 42 such that the first tooling axis 150 is generally parallel to, and preferably conincident with, the axis 48 of the ring gear 42; lowering the end effector 26 onto the ring gear 42; actuating the first concentric gripper 140 to clamp the first jaws 146 to the ring gear 42 to thereby hold the ring gear 42 such that its rotational axis 48 is coincident with the first tooling axis 150; and lifting the ring gear 42 from the pallet 32 in a direction that is parallel to the rotational axis 48 of the ring gear 42.

Loading of the pinion gear 44 to the first end 126 of the end effector 26 can include aligning the robot 24 and the end effector 26 to the pinion gear 44 such that the second tooling axis 188 is generally parallel to, and preferably conincident with, the axis 52 of the pinion gear; lowering the end effector 26 onto the pinion gear 44 such that the conical surface 200 (FIG. 11) of the thrust member 198 engages the conical recess 202 (FIG. 11) in the pinion gear 44 and moves the thrust member 198 (FIG. 11) rearwardly toward the beam portion 120 of the end effector 26; actuating the second concentric gripper 180 to clamp the second jaws about the pinion gear 44; and lifting the pinion gear 44 from the pallet 32 in a direction that is parallel to the rotational axis 52 of the pinion gear 44.

From the foregoing discussion of the first and second tooling subsets 130 and 132, it will be appreciated that the ring gear 42 and the pinion gear 44 are releasably coupled to the first end 126 of the beam portion 120 such that the axis 48 of the ring gear 42 is generally perpendicular to the axis 52 of the pinion gear 44.

The robot 24 and the end effector 26 can be operated to place the second end 128 of the end effector 26 into the loading zone 72 of the lapping machine tool 22. The second end 128 of the end effector 26 can be employed to remove a second gear set 40a (which has undergone the lapping operation) from the lapping machine tool 22 without removing the second end 128 of the end effector 26 from the loading zone 72. More specifically, the second end 128 of the end effector 26 can be employed to remove a ring gear 42a from the first spindle 62 and a pinion gear 44a from the second spindle 64. In the particular example provided, the ring gear 42a is removed from the first spindle 62 prior to the removal of the pinion gear 44a from the second spindle 64, but it will be appreciated that this order may be reversed.

Unloading of the ring gear 42a from the first spindle 62 to the second end 128 of the end effector 26 can include aligning the robot 24 and the end effector 26 to the ring gear 42a such that the first tooling axis 150 is generally parallel to and preferably coincident with the axis 48a of the ring gear 42a and the first rotational axis 68 of the first spindle 62; translating the end effector 26 onto the ring gear 42a; actuating the first concentric gripper 140 to clamp the first jaws 146 to the ring gear 42a to thereby hold the ring gear 42a such that its rotational axis 48a is parallel to and preferably coincident with the first tooling axis 150a; and translating the ring gear 42a away from the first spindle 62 in a direction that is parallel to the first rotational axis 68 of the first spindle 62. Unloading of the pinion gear 44a from the second spindle 64 to the second end 128 of the end effector 26 can include aligning the robot 24 and the end effector 26 to the pinion gear 44a and the second spindle 64 such that the second tooling axis 188a is generally parallel to and preferably coincident with the axis 52a of the pinion gear 44a and the second rotational axis 70; moving the end effector 26 onto the pinion gear 44a such that the conical surface 200 (FIG. 11) of the thrust member 198 engages the conical recess 202 (FIG. 11) in the pinion gear 44a and moves the thrust member 198 rearwardly toward the beam portion 120 of the end effector 26; actuating the second concentric gripper 180 to clamp the second jaws about the pinion gear 44a; and moving the pinion gear 44a from the second spindle 64 in a direction that is parallel to the second rotational axis 70.

The robot 24 can move the end effector 26 out of the loading zone 72, reposition the end effector 26 and move the first end 126 of the end effector 26 into the loading zone 72. In the example provided, the end effector 26 is lifted vertically out of the loading zone 72, the robot 24 and the end effector 26 are oriented such that the rotational axis 100 of the rotary coupling 88 is disposed in a vertical orientation, the end effector 26 is rotated 180°, the robot 24 and the end effector 26 are oriented such that the beam portion 120 of the end effector 26 is arranged vertically with the second end 128 below the first end 126 and the end effector 26 is lowered vertically into the loading zone 72 where the gear set 40 can be loaded to the first and second spindles 62 and 64 (so that the lapping operation may be performed) without removing the first end 126 of the end effector 26 from the loading zone 72. In the example provided, the pinion gear 44 can be loaded to the second spindle 64 prior to the loading of the ring gear 42 to the first spindle 62, but it will be appreciated that this order could be reversed.

Loading of the pinion gear 44 from the first end 126 of the end effector 26 to the second spindle 64 can include aligning the robot 24 and the end effector 26 to the second spindle 64 such that the second tooling axis 188 and the axis 52 of the pinion gear 44 are generally parallel to and preferably coincident with the second rotational axis 70; moving the end effector 26 such that the shaft member 54 of the pinion gear 44 is received into the second spindle 64; actuating the second concentric gripper 180 to unclamp the second jaws 186 from the pinion gear 44 to thereby cause the thrust member 198 to urge the pinion gear 44 into the second spindle 64; and moving the first end 126 of the end effector 26 in a direction that is parallel to the second rotational axis 70.

Loading of the ring gear 42 from the first end 126 of the end effector 26 to the first spindle 62 can include aligning the robot 24 and the end effector 26 to the first spindle 62 such that the first tooling axis 150 and the rotational axis 48 of the ring gear 42 are generally parallel to and preferably coincident with the first rotational axis 68 of the first spindle 62; moving the end effector 26 such that the ring gear 42 is received onto the first spindle 62; actuating the first concentric gripper 140 to unclamp the first jaws 146 from the ring gear 42; actuating the cylinder assembly 154 to extend the rod 160 to cause the thrust plate 156 to push against the ring gear 42 to seat the ring gear 42 on the first spindle 62 so that the ring gear 42 is abutted against a shoulder 250 that is formed on the first spindle 62; actuating the cylinder assembly 154 to retract the rod 160; and moving the first end 126 of the end effector 26 in a direction that is generally parallel to the first rotational axis 68 of the first spindle 62.

With the gear set 40 loaded to the first and second spindles 62 and 64, the robot 24 can withdraw the end effector 26 from the loading zone 72 and can manipulate the end effector 26 relative to another pallet 32b at the loading station 36 to load a third gear set 40b from the pallet 32b to the first end 126 of the end effector 26. As the loading of gear sets from a pallet to the end effector has been discussed in detail above, a discussion of this portion of the methodology need not be provided herein. It will suffice to say that an untapped gear set can be loaded from the pallet 32b to the first end 126 of the end effector 26 to thereby provide spaces on the pallet 32b for the receipt of the lapped gear set that is held by the second end 128 of the end effector 26. In the example provided, the ring gear 42a is unloaded from the second end 128 of the end effector 26 to the pallet 32b prior to the unloading of the pinion gear 44a.

Loading of the ring gear 42a from the first end 126 of the end effector 26 to the pallet 32 can include aligning the robot 24 and the end effector 26 to a predetermined second location on the pallet 32; lowering the ring gear 42a to the second predetermined location on the pallet 32 in a direction that is parallel to the rotational axis 48 of the ring gear 42a; actuating the first concentric gripper 140 to unclamp the first jaws 146 from the ring gear 42a; and withdrawing the end effector 26 from the ring gear 42a.

Loading of the pinion gear 44a from the second end 128 of the end effector 26 to the pallet 32 can include aligning the robot 24 and the end effector 26 to a predetermined location on the pallet 32; lowering the pinion gear 44a to the predetermined location on the pallet 32 in a direction that is parallel to the rotational axis 52 of the pinion gear 44a; actuating the second concentric gripper 180 to unclamp the second jaws from the pinion gear 44a; and withdrawing the end effector 26 from the pinion gear 44a.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A system for lapping gear sets, each of the gear sets including a ring gear and a pinion gear, the system comprising:
   a lapping machine tool having a first spindle and a second spindle, the second spindle being rotatable about an axis that is generally perpendicular to a rotational axis of the first spindle, the lapping machine tool having a loading zone for loading the first and second spindles;
   a robot with an end effector, the end effector having a first end that is configured to hold one of the gear sets;
   wherein the robot is configured to position the first end of the end effector into the loading zone and to load the first gear set to the lapping machine tool without removing the end effector from the loading zone such that the ring gear is loaded onto the first spindle and the pinion gear is loaded onto the second spindle.

2. The system of claim 1, wherein the robot is configured to load the pinion gear to the second spindle before loading the ring gear to the first spindle.

3. The system of claim 1, wherein the robot includes an articulating arm that is coupled to the end effector, the articulating arm having a first arm member and a second arm member that is pivotally coupled to the first arm member.

4. The system of claim 1, wherein the end effector is configured to orient the ring gear such that a rotational axis of the ring gear is disposed in a predetermined attitude and to position the pinion gear such that a rotational axis of the pinion gear is generally perpendicular to the rotational axis of the ring gear.

5. The system of claim 1, wherein the end effector includes a second end to hold a second gear set.

6. The system of claim 5 wherein the robot is configured to position the second end of the end effector into the loading zone and unload the second gear set from the lapping machine tool to the second end of the end effector prior to loading the first gear set held by the first end of the end effector to the lapping machine tool.

7. A system for lapping gear sets, each of the gear sets including a ring gear and a pinion gear, the system comprising:
   a first lapping machine tool having a first spindle and a second spindle, the second spindle of the first lapping machine tool being rotatable about an axis that is generally perpendicular to a rotational axis of the first spindle of the first lapping machine tool, the first lapping machine tool having a first loading zone for loading the first and second spindles of the first lapping machine tool;
   a robot with an end effector, the end effector having a first end that is configured to hold one of the gear sets;
   wherein the robot is configured to position the first end of the end effector into the first loading zone and to unload the first gear set from the first lapping machine tool without removing the end effector from the first loading zone such that the ring gear is unloaded from the first spindle of the first lapping machine tool and the pinion gear is unloaded from the second spindle of the first lapping machine tool.

8. The system of claim 7, wherein the robot is configured to unload the ring gear from the first spindle of the first lapping machine tool before unloading the pinion gear from the second spindle of the first lapping machine tool.

9. The system of claim 7, wherein the robot includes an articulating arm that is coupled to the end effector, the articulating arm having a first arm member and a second arm member that is pivotally coupled to the first arm member.

10. The system of claim 7, wherein the end effector is configured to orient the ring gear such that a rotational axis of the ring gear is disposed in a predetermined attitude and to position the pinion gear such that a rotational axis of the pinion gear is generally perpendicular to the rotational axis of the ring gear.

11. The system of claim 7, wherein the end effector includes a second end that is adapted to hold another one of the gear sets.

12. The system of claim 7, further comprising a second lapping machine tool having a first spindle and a second spindle, the second spindle of the second lapping machine tool being rotatable about an axis that is generally perpendicular to a rotational axis of the first spindle of the second lapping machine tool, the second lapping machine tool having a second loading zone for loading the first and second spindles of the second lapping machine tool and wherein the robot is configured to position the first end of the end effector into the second loading zone and to unload a second one of the gear sets from the second lapping machine tool without removing the end effector from the second loading zone such that the ring gear is unloaded from the first spindle of the second lapping machine tool and the pinion gear is unloaded from the second spindle of the second lapping machine tool.

13. The system of claim 12, wherein the robot is configured to unload and load one of the first and second lapping machine tools and then unload and load the other one of the first and second lapping machine tools.

14. A system for lapping gear sets, each of the gear sets including a ring gear and a pinion gear, the system comprising:
   a robot with an articulating arm having a first arm member and a second arm member that is pivotally coupled to the first arm member; and
   an end effector having a beam portion, a first tooling set and a second tooling set, the beam portion including a first end and a second end opposite the first end, the beam portion including a rotational axis that is disposed between the first and second ends, the first tooling set being coupled to the first end of the beam portion and including a first tooling subset and a second tooling subset, the first tooling subset having a first set of jaws that are arranged about a first gear axis and which are releasably engaging the ring gear of a first one of the gear sets, the second tooling subset having a second set of jaws that are arranged about a second gear axis, the second gear axis being perpendicular to the first gear axis, the second set of jaws being releasably engaging the pinion pear of the first pear set, the second tooling set being coupled to the second end of the beam portion and being identical to the first tooling set.

15. The system of claim 14, wherein the second tooling subset further includes an abutting member that is spaced apart from the second set of jaws and wherein the abutting member and the second set of jaws cooperate to capture the pinion gear.

16. The system of claim 15, wherein the abutting member has a conical abutting surface to mate with a surface of a mating conical recess that is formed in the pinion gear.

17. The system of claim 14, wherein the second jaws travel in directions that are perpendicular to the second gear axis.

18. The system of claim 14, wherein the first jaws move in directions that are perpendicular to the first gear axis.

19. A system for lapping gear sets, each of the gear sets including a first gear and a second gear, the system comprising:
- a robot with an articulating arm having a first arm member and a second arm member that is pivotally coupled to the first arm member; and
- an end effector having a beam portion, a first tooling set and a second tooling set, the beam portion including a first end and a second end opposite the first end, the beam portion including a rotational axis that is disposed between the first and second ends, the first tooling set being coupled to the first end of the beam portion and including a first tooling subset and a second tooling subset, the first tooling subset having a first set of jaws that are arranged about a first gear axis and which are releasably engaging the first gear of a first one of the gear sets, the second tooling subset having a second set of jaws that are arranged about a second gear axis, the second gear axis being perpendicular to the first gear axis, the second set of jaws being releasably engaging the second gear, the second tooling set being coupled to the second end of the beam portion and being identical to the first tooling set;
- wherein the second tooling subset further includes an abutting member that is spaced apart from the second set of jaws and wherein the abutting member and the second set of jaws cooperate to capture the second gear, wherein the abutting member has a conical abutting surface to mate with a surface of a mating conical recess that is formed in the second gear, wherein the second jaws travel in directions that are perpendicular to the second gear axis, and wherein the first jaws move in directions that are perpendicular to the first gear axis.

20. A system for lapping gear sets, each of the gear sets including a first gear and a second gear, the system comprising:
- a robot with an articulating arm having a first arm member and a second arm member that is pivotally coupled to the first arm member; and
- an end effector having a beam portion, a first tooling set and a second tooling set, the beam portion including a first end and a second end opposite the first end, the beam portion including a rotational axis that is disposed between the first and second ends, the first tooling set being coupled to the first end of the beam portion and including a first tooling subset and a second tooling subset, the first tooling subset arranged about a first gear axis and releasably engaging the first gear of a first gear set, the second tooling subset arranged about a second gear axis that is perpendicular to the first gear axis and releasably engaging the second gear of the first gear set, the second tooling set being coupled to the second end of the beam portion.

21. The system of claim 20 wherein the first gear is a ring gear and the second gear is a pinion gear.

* * * * *